United States Patent

[11] 3,599,993

| [72] | Inventor | Bror Allan Eriksson<br>Karlstad, Sweden |
| --- | --- | --- |
| [21] | Appl. No. | 6,391 |
| [22] | Filed | Jan. 28, 1970 |
| [45] | Patented | Aug. 17, 1971 |
| [73] | Assignee | Skega Aktiebolag<br>Skelleftea, Sweden |
| [32] | Priority | Jan. 29, 1969 |
| [33] | | Sweden |
| [31] | | 1150/69 |

[54] DEVICE FOR SEALING OF A ROTARY SHAFT
10 Claims, 1 Drawing Fig.

| [52] | U.S. Cl. | 277/59 |
| --- | --- | --- |
| [51] | Int. Cl. | F16j 108 |
| [50] | Field of Search | 118/125;<br>227/4, 5, 59—65 |

[56] References Cited
UNITED STATES PATENTS

| 1,768,606 | 7/1930 | Keilholtz et al. | 277/65 |
| --- | --- | --- | --- |
| 3,030,118 | 4/1962 | Groce | 277/4 |
| 3,390,662 | 7/1968 | Wood | 118/125 |

FOREIGN PATENTS

| 333,339 | 8/1930 | Great Britain | 277/59 |

*Primary Examiner*—Robert J. Smith
*Attorney*—Cushman, Darby & Cushman

ABSTRACT: A sealing device is disclosed, wherein a rotary shaft is sealed to a stationary housing or similar. A sealing means engaging the shaft is somewhat movable with the shaft in the peripheral direction. Said sealing means is held by a flexible sleeve which is shortened when twisted. The sleeve encloses a supply of lubricant that is put under raised pressure when the sleeve is twisted, thereby preventing undesired passage of particles or fluids past the sealing means.

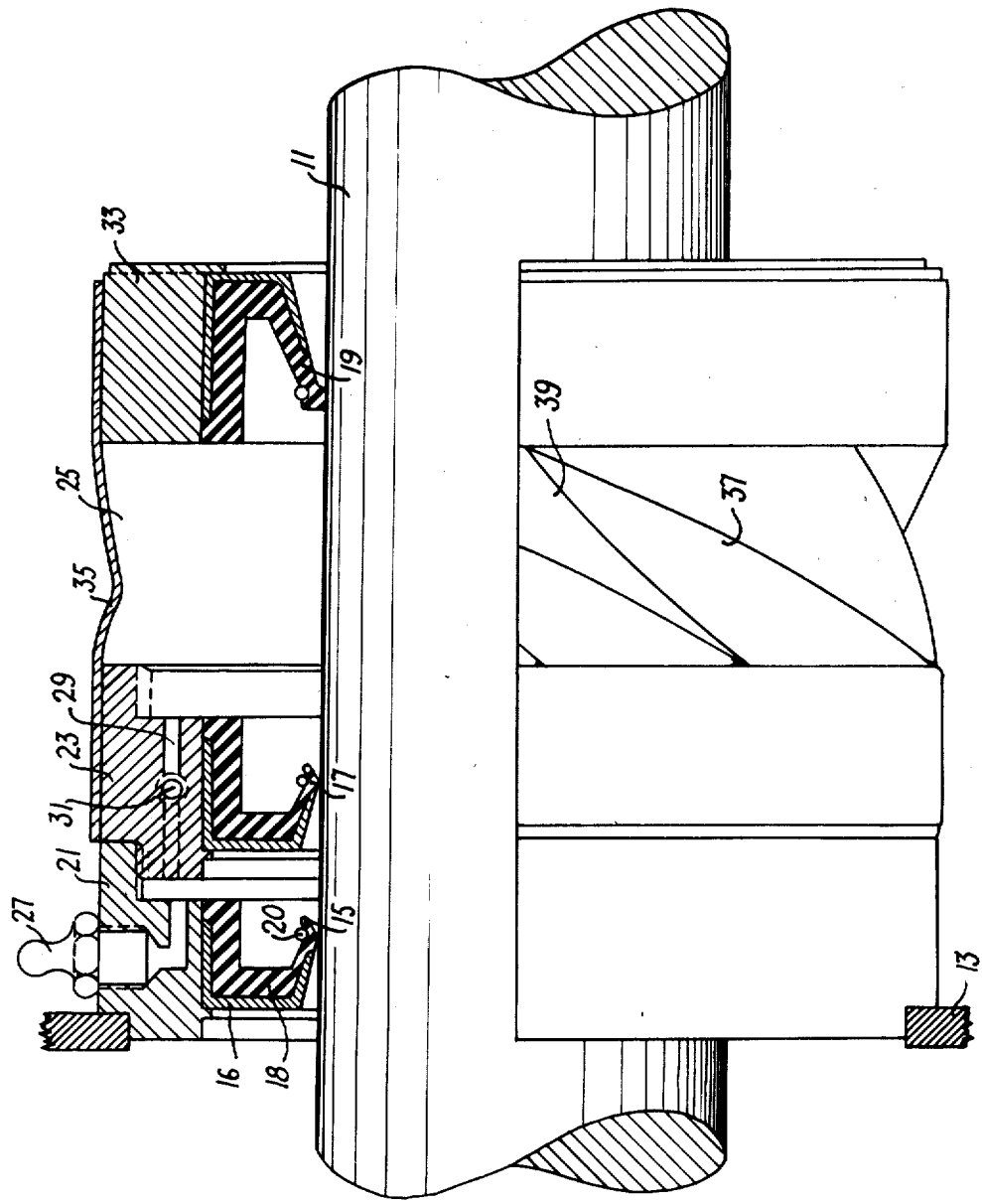

DEVICE FOR SEALING OF A ROTARY SHAFT

This invention relates to a shaft-sealing device of the kind wherein a lubricant container surrounding the shaft is bounded in at least one axial direction by a resilient sealing means bearing against the shaft and preferably shaped as a circular sealing lip. Sealing devices of this kind are used particularly where the shaft passes through the shell of a housing, for example a pump housing, which encloses water or other liquid or a gas and which may be under superatmospheric pressure.

The object of the invention is to maintain in a simple manner a desired superatmospheric pressure in the lubricant container. In principle said object is achieved by using the friction of the sealing means against the shaft for transmitting pressure to the lubricant in the container.

The invention provides a device for sealing a rotary shaft, said device comprising a resilient sealing means for engaging the periphery of such a shaft, and a flexible, substantially inextensible sleeve attached to said sealing means, extending axially with respect to said sealing means and having an internal diameter substantially greater than that of the sealing means, the arrangement being such that when the said sealing means is disposed on a shaft to seal the same, the said sleeve is attached at a point axially spaced from the sealing means to a housing with respect to which the shaft is rotatable, and a space enclosed by the sleeve is filled with lubricant, rotation of the shaft is effective to rotate the sealing means thus effecting twisting of said sleeve with axial compression thereof to exert a pressure upon lubricant contained therein. When the shaft rotates, the sealing means is caused to rotate with the same through a certain angle in the direction of rotation of the shaft, due to the frictional engagement, the sleeve being deformed and exerting a raised pressure upon the lubricant, which pressure reacts hydraulically upon the sealing means and restricts its movement.

The invention is illustrated by way of example in the accompanying drawing, the single FIGURE of which shows a preferred embodiment of sealing device according to the invention, the upper half being shown in axial section and the lower half being shown in elevation.

Referring to the drawing, a rotary shaft 11 is sealed into a wall 13 so that gases or liquids of different kind, pressure and temperature can be retained on their respective sides of the wall and no flow can take place along the shaft. For instance, the wall 13 forms part of a pump housing filled with water or other liquid and possibly under superatmospheric pressure. In this case the shaft 11 serves to transmit driving force to a pump impeller located in the housing and attached to the free end of the shaft, the shaft being journaled in bearings (not shown) located outside the housing. If desired, the object of the sealing of the shaft may be merely to prevent dust or dirt particles from penetrating past the same into the space on the other side of the wall and reaching bearings or delicate apparatus located there.

The sealing device shown in the drawing, which is intended to provide a seal against an excess pressure prevailing on the right-hand side of the wall 13 as viewed in the drawing, comprises three radial sealing members 15, 17, 19 which are spaced axially and are of the kind known under the trade name Stefa sealing members, wherein a metallic ring 16 of a U-shaped cross section encloses a rubber ring 18 having a sleevelike sealing lip which is pressed against the cylindrical face of the shaft by means of a helical spring 20 extending around the latter within the lip so that the lip makes sealing engagement with the periphery of the shaft. The sealing lips of the sealing members 15, 17 are directed inwardly towards the pressure side and are therefore pressed into contact with the shaft due to the pressure difference between their opposite sides. The excess pressure upon the right-hand side of the wall is distributed upon said two sealing means, each one resisting merely half of the total excess pressure. The radial seals 15, 17 are each fastened to an outer retainer ring 21, 23, and said two rings are screwed together and attached to the wall 13 so that they are held rigidly and nonrotatably relatively to the wall.

The third radial seal 19 is axially spaced from the seal 17 in order to leave space for a lubricant container 25 which completely surrounds the shaft 11, so that a part of the shaft rotates in the lubricant in said container. Lubricant can be supplied to the container 25 through a nipple 27 and a connecting passage 29 extending through the retainer rings 21, 23 and in which a reducing valve 31 is inserted.

The seal 19 is also fastened to an exterior retainer ring 33 which, however, is not fixed as are the other retainer rings 21, 23, but is to a certain extent movable relatively thereto. Said movability which is characteristic of the invention is provided for by means of a readily deformable thin cylindrical tubular sleeve or hose 35 connected between the retainer rings 23 and 33. The opposite ends of said sleeve 35 are slipped over the retainer rings 23, 33 and attached thereto by glueing, welding, clamping by hose clips or by winding with tape or thread or in any other suitable manner. The center part of the sleeve 35 is not supported on any side but is quite free to take other shapes than the original cylindrical shape. The sleeve comprises a thin tubular continuous and integral foil of a uniform thickness and of a nonmetallic material which is readily flexible but is substantially nonelastic and substantially unstretchable. Furthermore the material should be soft and tough so that it can withstand repeated foldings. Among modern plastics there are many suitable materials, e.g. polyethylene, polyester, nylon. The thickness of the sleeve depends upon the material used and would lie in the range of 0.05 to 0.5 mm., preferably 0.1 to 0.2 mm., in a sleeve having a diameter of 50 mm. The sleeve is spaced from the shaft at a considerable distance, its diameter being at least 50 percent greater than that of the shaft. Preferably its free deformable length is 25 to 100 percent of its diameter. With these measurements, which are by no means essential functional requirements, a comparatively large lubricant container is formed which need not be refilled so often. The sleeve 35 forms an exterior wall of said container, the remainder of which is defined by the sealing means 17, 19 and their retainer rings 23, 33. The shaft-engaging lip of the sealing means 19 is directed in the opposite direction to the two other lips, but like these extends inwardly of the lubricant container, so that it will be urged against the shaft with a greater force when an excess pressure is present in the lubricant container. Such an excess pressure also acts axially upon the sealing means 19 and its retainer ring 33, thus extending the sleeve in the axial direction. When the shaft does not rotate, the same pressure normally is present inside the sleeve as outside the same, while the external pressure is transferred to the inside of the sleeve due to low resistance of the thin sleeve to deformation. When the lubricant container has just been refilled and no lubricant has yet been spent so that the sleeve is fully expanded by the lubricant, an excess pressure may be present inside the same even when the shaft is not rotating.

As soon as the shaft rotates, on account of its frictional engagement with the shaft the seal 19 will tend to follow the shaft in the direction of rotation, and due to the flexibility of the sleeve 35 the seal 19 can rotate with the shaft 11, twisting the sleeve.

Since the sleeve 35 is nonelastic and unstretchable, twisting of the sleeve shortens it in the axial direction. The peripheral movement of the seal 19 is thus accompanied by an axial displacement in the direction towards the other radial seal 17. Thereby the volume of the lubricant container is reduced and the lubricant is put under a certain excess pressure. This hydraulic pressure reacts upon the parts 19, 33 and applies a force thereon in the opposite axial direction, so that the described movement of the seal 19 is counteracted and slowed down. Thus an equilibrium will develop automatically, so that the lubricant will be maintained under a certain pressure. Due to said lubricant pressure, foreign particles are prevented from entering the lubricant container, and only lubricant can pass the sealing means and only in the direction out of the same.

However, the consumption of lubricant is small due to the fact that the excess pressure inside the lubricant container is usually relatively low and that the sealing lip 19 engages the shaft 11 more tightly as the pressure in the container rises. As the lubricant is consumed, the radial seal 19 is turned further and the sleeve 35 is twisted to an increased extent. It will be formed with helically extending folds consisting of stretched ridgelike parts 37 and intervening flutelike recesses 39. Simultaneously the retainer rings 23, 33 will approach more closely together. In the extreme end position the retainer ring 33 may have turned through, for example, three-sixteenths of the entire circumference and become displaced so far in the axial direction that the folds of the sleeve are compressed against the retainer ring 23. Preferably before this position has been reached, a new supply of lubricant should be introduced, so that the seal 19 and its retainer ring are brought back to the right-hand end position and the sleeve reassumes its cylindrical shape. In operation over prolonged periods, the seal 19 will obviously move back and forth along the shaft, reducing the risk of a groove being worn in its surface.

According to a modification of the sealing device described above, it may be used for retaining lubricant in a bearing and to protect the same against the ingress of particles. In such a device a ball bearing or other bearing will take the place of the radial seal 17 and the wall 13 will be replaced by a bearing bracket or the like.

According to further possible modifications, the sealing means 19 may have its lip directed in the opposite direction to that shown, or it may be replaced by a sealing means of any kind. Moreover the sleeve 35 need not be cylindrical but may for example be conical.

I claim:

1. A device for sealing a rotary shaft, said device comprising a resilient sealing means for engaging the periphery of such a shaft, and a flexible, substantially inextensible sleeve attached to said sealing means, extending axially with respect to said sealing means and having an internal diameter substantially greater than that of the sealing means, the arrangement being such that when the said sealing means is disposed on a shaft to seal the same, the said sleeve is attached at a point axially spaced from the sealing means to a housing with respect to which the shaft is rotatable, and a space enclosed by the sleeve is filled with lubricant, rotation of the shaft is effective to rotate the sealing means thus effecting twisting of said sleeve with axial compression thereof to exert a pressure upon lubricant contained therein.

2. A device as claimed in claim 1, in which the diameter of said sleeve is at least 50 percent greater than the internal diameter of the sealing means.

3. A device as claimed in claim 1, in which the length of the flexible portion of the sleeve is between 25 percent and 100 percent of its diameter.

4. A device as claimed in claim 1, including a further sealing means for the shaft, the sleeve extending between said sealing means in order to define together therewith an enclosure for lubricant, and the said sealing means being relatively rotatable.

5. A device as claimed in claim 1, in which the sealing means comprises a circular sealing lip.

6. A device for sealing a rotary shaft to a nonrotary part, comprising a sealing means tightly engaging the periphery of said shaft, and a twistable sleeve surrounding said shaft and connecting said sealing means to said nonrotary part in such a manner as to allow said sealing means to turn with the shaft through an angle forming a substantial part of one revolution.

7. A device as claimed in claim 6, in which the maximum value of said angle is at least 5° and not exceeding 150°.

8. A device as claimed in claim 6, in which the maximum value of said angle is at least 20° and not exceeding 70°.

9. A device as claimed in claim 6, in which said sleeve is twisted to form a number of essentially straight ridges and intermediate furrows extending over the main length of the sleeve and at an angle to the shaft as well as to a plane perpendicular thereto.

10. A stationary housing, a rotary shaft extending through a wall of said housing, a first sealing member attached to said housing, said sealing member comprising a resilient circular lip held in engagement with the periphery of said shaft, a second sealing member axially spaced from said first sealing member, said second sealing member comprising a resilient circular lip held in engagement with the periphery of said shaft, a flexible sleeve surrounding said shaft at a distance therefrom to form an enclosed space for lubricant around said shaft, one end of said sleeve being fixed and the other end thereof holding said second sealing member in such a manner as to allow axial and peripheral displacement thereof.